US012512672B2

(12) United States Patent
Werner et al.

(10) Patent No.: US 12,512,672 B2
(45) Date of Patent: Dec. 30, 2025

(54) SYSTEM LEVEL PHASE UNBALANCING TO IMPROVE OVERALL DATA CENTER SUSTAINABILITY

(71) Applicant: International Business Machines Corporation, Armonk, NY (US)

(72) Inventors: John S. Werner, Fishkill, NY (US); Luke L. Jenkins, Poughkeepsie, NY (US); Arkadiy O. Tsfasman, Wappingers Falls, NY (US); John Torok, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 18/535,586

(22) Filed: Dec. 11, 2023

(65) Prior Publication Data

US 2025/0192552 A1    Jun. 12, 2025

(51) Int. Cl.
*G06F 1/28* (2006.01)
*H02J 3/12* (2006.01)

(52) U.S. Cl.
CPC . *H02J 3/12* (2013.01); *G06F 1/28* (2013.01)

(58) Field of Classification Search
CPC ................................ H02J 3/12; G06F 1/28
See application file for complete search history.

(56) References Cited

U.S. PATENT DOCUMENTS

| | | | |
|---|---|---|---|
| 11,073,886 B2 | 7/2021 | Xu et al. | |
| 11,135,923 B2 | 10/2021 | Slepchenkov et al. | |
| 2010/0123440 A1* | 5/2010 | Bandholz | H02M 3/1584 323/272 |
| 2014/0159483 A1* | 6/2014 | Robertazzi | H02J 3/26 307/14 |
| 2015/0253808 A1* | 9/2015 | Chadwick | G06F 13/20 713/503 |
| 2016/0313779 A1* | 10/2016 | Gupta | H02J 13/00001 |
| 2017/0185138 A1* | 6/2017 | Suzuki | G06F 1/266 |
| 2018/0101206 A1* | 4/2018 | Chapel | G06F 1/28 |

(Continued)

OTHER PUBLICATIONS

Ayan Banerjee et al., "Effects of phase imbalance on data center energy management," ResearchGate, Dated: Dec. 2013, pp. 1-11.
"The Race to Decarbonization: A Spotlight on Data Centers: Results from The Nov. 2021 Thought Leadership Paper," Forrester, Year: 2021, pp. 1-12.

(Continued)

*Primary Examiner* — Aurel Prifti
(74) *Attorney, Agent, or Firm* — Patterson + Sheridan, LLP

(57) ABSTRACT

Disclosed embodiments provide methods, systems, and computer program products for implementing enhanced phase power load balancing of a set of systems (e.g., the set of systems of a data center) using a subset of the systems. Disclosed embodiments extract phase currents of a three-phase power source of the set of systems, and determine, based on extracted phase currents for the set of systems, input phase power load balancing for the subset of the systems. Disclosed embodiments alter the current input phase power balancing of the subset, unbalancing the input phase power load for the subset of the systems to provide enhanced phase power load balancing of the set of systems. Altering the current input phase power balancing for the subset of the systems can be implemented by power shifting between power supply units (PSUs), phase rotations, or input phase switching of power distribution unit (PDU) switchable output ports.

20 Claims, 9 Drawing Sheets

(56) References Cited

U.S. PATENT DOCUMENTS

| | | | |
|---|---|---|---|
| 2020/0117263 A1 | 4/2020 | Xu et al. | |
| 2020/0313445 A1 | 10/2020 | Slepchenkov et al. | |
| 2021/0296900 A1* | 9/2021 | Wanes | H02J 3/28 |
| 2021/0347277 A1* | 11/2021 | Lee | H02J 3/26 |
| 2021/0408791 A1* | 12/2021 | Zimmanck | H02J 3/26 |
| 2022/0004475 A1 | 1/2022 | Benoit | |
| 2022/0185141 A1* | 6/2022 | Brombach | B60L 53/67 |
| 2023/0097568 A1* | 3/2023 | Zhu | H02J 3/26 307/14 |
| 2024/0146063 A1* | 5/2024 | Schlak | H02J 3/26 |
| 2024/0305226 A1* | 9/2024 | Gross | H02J 3/46 |
| 2024/0405562 A1* | 12/2024 | Sun | H02J 3/38 |
| 2025/0070557 A1* | 2/2025 | Yang | H02J 3/466 |
| 2025/0158403 A1* | 5/2025 | Werner | G05B 15/02 |
| 2025/0210990 A1* | 6/2025 | Werner | H02J 13/00002 |

OTHER PUBLICATIONS

Authors et al., "High Efficiency Power Management with Dynamic Phase Control," ip.com, IP.com No. OPCOM000181795D, Dated: Apr. 13, 2009, pp. 1-5.

Authors et al., "An Analytical Method and System for Data Center Capacity Management at Phase Level," ip.com, IP.com No. IPCOM000242538D dated Jul. 23, 2015, pp. 1-3.

Authors et al., "Method and Framework for Profit Maximization of Data Center," ip.com, IP.com No. IPCOM000247782D, Dated: Oct. 6, 2016, pp. 1-12.

Authors et al., "Multi-Stage 48V to Point-of-Load (POL) Power Architechture for Ultra-High Current Processing Unit Applications," ip.com, IP.Com No. IPCOM000255077D, dated: Aug. 29, 2018, pp. 1-8.

Matteo Manganelli et al., "Strategies for Improving the Sustainabity of Data Centers via Energy Mix, Energy Conservation, and Circular Energy," sustainability: MDPI, Dated: May 28, 2021, pp. 1-25.

* cited by examiner

SYSTEM LEVEL PHASE UNBALANCING TO IMPROVE OVERALL DATA CENTER SUSTAINABILITY

BACKGROUND

The present invention relates to power distribution units, and more specifically, to implementing phase load balancing of a facility's three phase (3-phase) power source by adjusting the current distribution within a computer system or group of computer systems.

Typically, a 3-phase power source for a set of systems, such as a data center infrastructure, supplies 3-phase power feed outputs to each system of the set of systems. In the set of systems, Power Distribution Units (PDUs) are often used to distribute power to power supply units (PSUs) that run downstream equipment such as, processor drawers, I/O drawers, computers, peripherals, computer cooling equipment, and the like. Unbalanced input phases of a single system within the set of systems can result where output ports that connect to one input phase draw more power than other output ports that connect to other input phases (e.g., with unbalanced power of the respective output loads). Unbalanced power feed phase outputs to the set of systems can result where the systems draw more power from one power feed output phase than the other power feed output phases.

Balancing an unbalanced input load phases of a single system within the set of systems typically has minimal impact at the over all systems' infrastructure level to correct unbalanced power feed phase outputs to the set of systems. For example, other systems within the same set of systems may be unbalanced, (and, may or may not be adjusted individually) so that balancing the input phases of the single system typically would fail to correct the phase imbalance to the set of systems. Unbalanced power phases can waste power (e.g., due to power ($I^2R$) distribution effects) and limit utilization of three-phase power sources, which can lead to exceeding line cord ratings on individual phases, excessive heating in cables, connectors, relays, and/or circuit breakers, and tripping downstream circuit breakers, which in turn can lead to tripping upstream circuit breakers and can cause failures to product safety standards.

SUMMARY

Embodiments of the present disclosure are directed to methods, systems, and computer program products for implementing enhanced phase power load balancing of a set of systems using a subset of the systems.

According to one embodiment of the present disclosure, a non-limiting computer implemented method is provided. The method comprises extracting data of phase currents for a set of systems, where the phase currents comprise three-phase current source outputs applied to the respective systems; determining, based on extracted phase currents for the set of systems, an input phase power load balancing for a subset of the systems, where the subset of the systems is used for phase power load balancing the set of system; and altering the input phase load balancing for the subset of the systems to unbalance the input phase load balancing of the subset of the systems to provide enhanced phase load balancing for the set of systems.

Other disclosed embodiments include a computer system and computer program product for phase load balancing of a set of systems using a subset of the systems, implementing features of the above-disclosed method.

DETAILED DESCRIPTION

Figure 1:
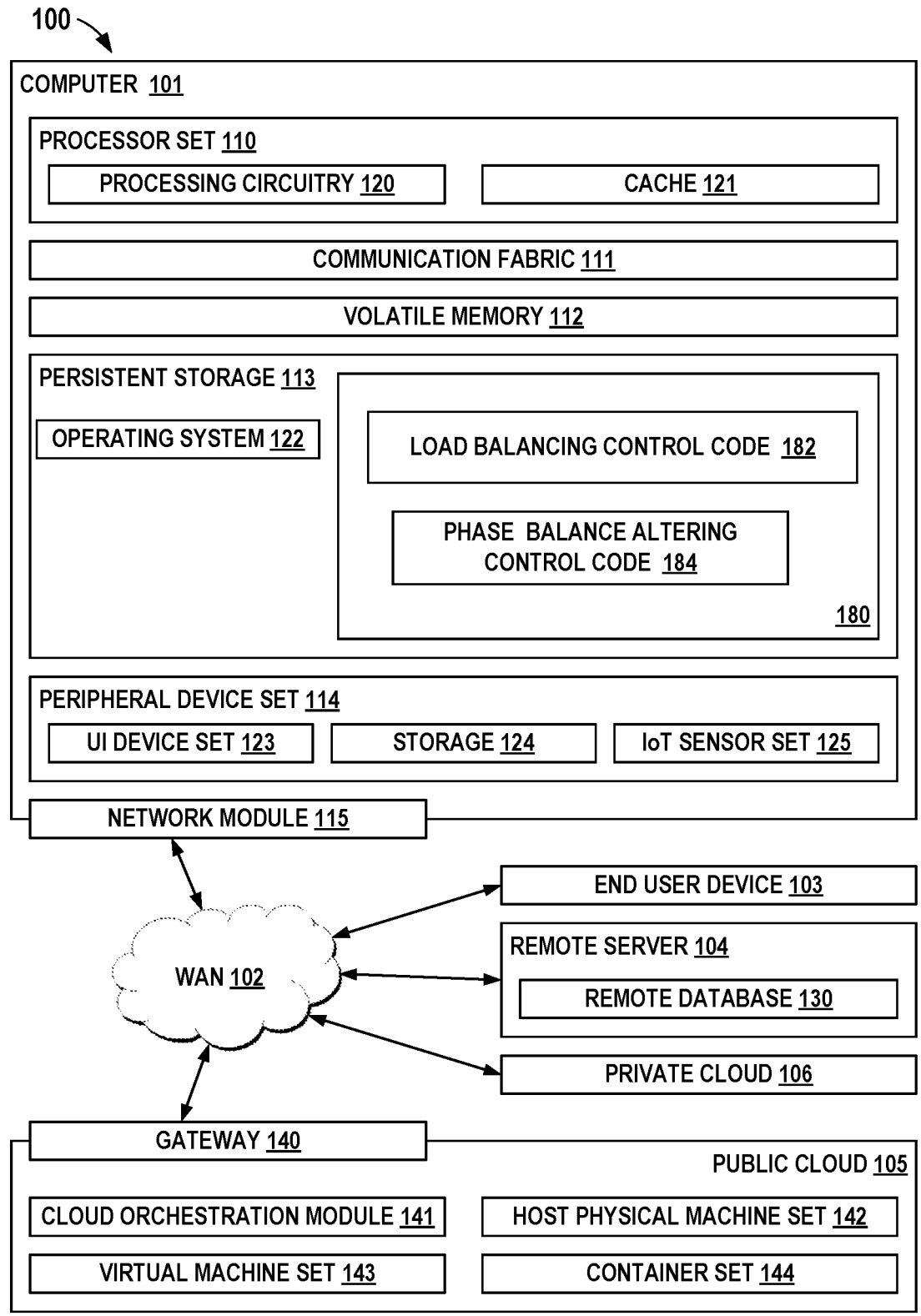
FIG. 1 is a block diagram of an example computer environment for use in conjunction with one or more disclosed embodiments.

The embodiments herein describe new techniques for balancing phase power loads of a data center infrastructure that supplies three-phase power feed outputs to multiple data center systems. Unbalanced power load phases of the data center systems can waste power (e.g., due to power ($I^2R$) distribution effects) and limit utilization of data center three-phase power sources. Unbalanced phase power loads at a level of the data center systems present unsolved challenges for existing data center management systems. For example, unbalanced power load phases of the data center system level can result from some of the individual data center systems having unbalanced power load phases, i.e., drawing more power from one power feed output phase than the other power feed output phases, and may not be adjusted individually by the data center management system. Disclosed methods enable enhanced phase power load balancing of the total data center systems using a subset of the systems. In an embodiment, phase currents are extracted for the data center systems, and phase power load balancing is obtained for the subset of the systems based on the phase currents. The subset of the systems enable phase power load balancing of the entire data center systems by altering the phase power load balancing of the subset of the systems, unbalancing the input phase power loads of the subset of the systems, to provide enhanced phase power load balancing of the data center systems. Altering the phase power load balancing of the subset of the systems can be implemented by power shifting between PSUs, phase rotations, or input phase switching of PDU switchable output ports of disclosed embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 contains an example of an environment for the execution of at least some of the computer code involved in performing the inventive methods, such as PDU Output Load Switching Control Code 182, and Phase Power Load Balance Altering Control Code 184, at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Disclosed embodiments implement enhanced phase power load balancing of a set of systems (e.g., the set of systems of a data center) using a subset of the systems. In a disclosed embodiment, a system extracts phase currents of a three-phase power source of the set of systems, and determines, based on extracted phase currents for the set of systems, an initial input phase power load balancing for the subset of the systems. The initial input phase power load balancing for the subset of the systems represents optimal phase current set points (substantially equal phase currents) for the subset of systems. In disclosed embodiments, the current input phase power balancing of the subset are altered, unbalancing the input phase power load for the subset of the systems to provide enhanced phase power load balancing of the set of systems. Altering the current input phase power balancing for the subset of the systems of disclosed embodiments can be implemented by power shifting between PSUs, phase rotations, or input phase switching of PDU switchable output ports.

In a disclosed embodiment, one or more of the respective individual systems of the subset of the systems include a PDU comprising switchable output ports. In a disclosed embodiment, switching input phases that connect to one or more PDU output ports is operatively controlled for initial balancing and for altering the input phase power balancing for the subset of the systems to improve phase power load balancing of the set of systems. The input phases switching of PDU output ports are controlled to selectively unbalance the subset of the systems to provide enhanced phase power load balancing for the set of systems. In a disclosed embodiment, one or more PSUs) are coupled to one or more PDU switchable output ports, and altering the input phase power load balancing for the subset of the systems includes power shifting between the one or more PSUs to unbalance the input phase power load balancing of the subset of the systems to provide the enhanced phase power load balancing for the set of systems. In a disclosed embodiment, altering the input phase power balancing for the subset of the systems includes performing input phase rotations for the subset of the systems to unbalance the input phase power load balancing of the subset of the systems to provide the enhanced phase power load balancing for the set of systems. The input phase rotations, or phase sequences, is the order in which the voltage waveforms of a polyphase AC source reach their respective peaks. For example, in a three-phase power feed input, there are two possible phase sequences: 1-2-3 and 3-2-1, corresponding to the two possible directions of alternator rotation.

Figure 2:
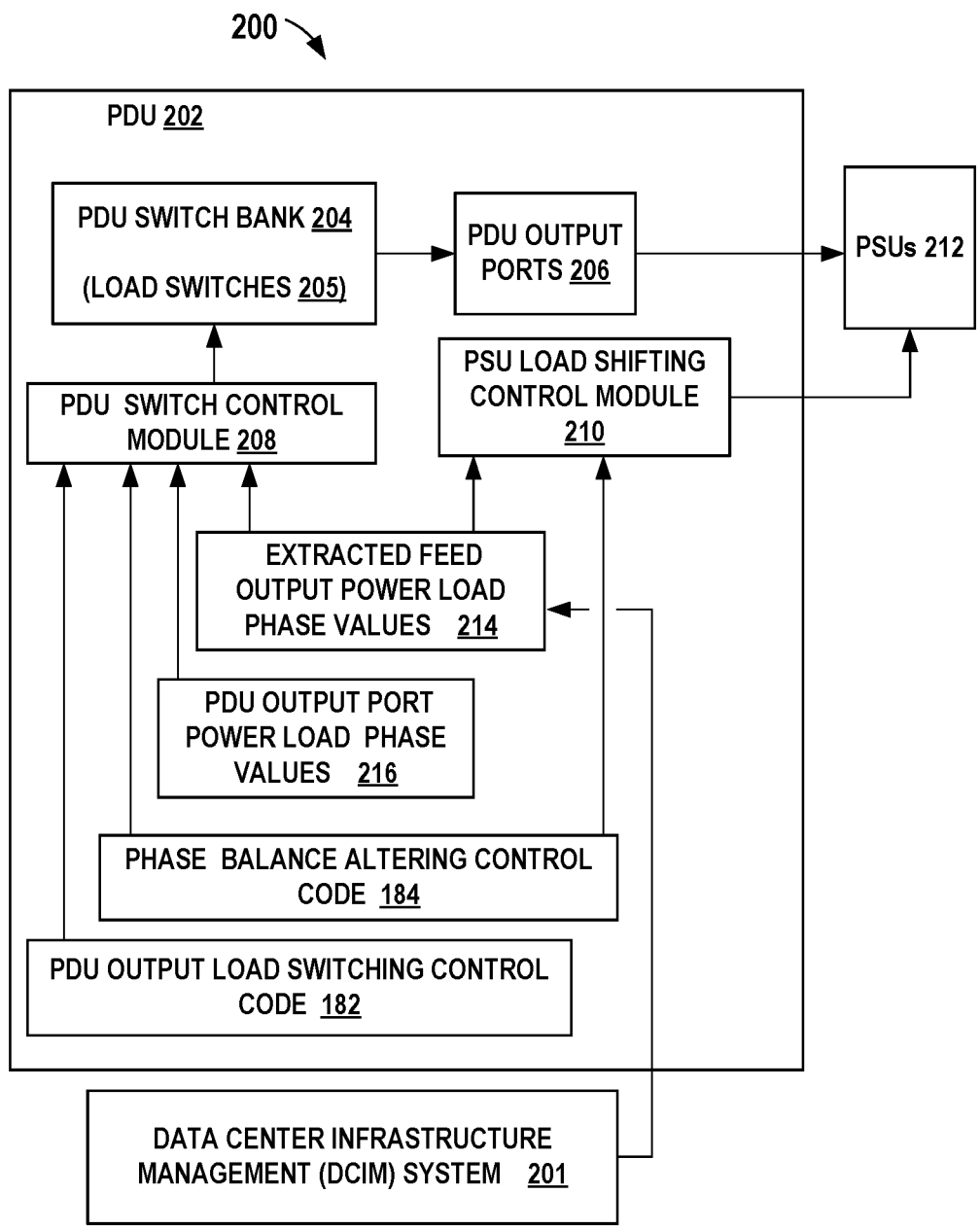
FIG. 2 is a schematic and block diagram illustrating an example system for implementing phase load balancing of a set of systems using a subset of the systems in accordance with one or more disclosed embodiments.

FIG. 2 illustrates an example system 200 of disclosed embodiments. System 200 can be used in conjunction with the computer 101 and the computing environment 100 of FIG. 1 and the PDU Output Load Switching Control Code 182, and the Phase Power Load Balance Altering Control Code 184 for implementing inventive methods of disclosed embodiments.

System 200 represents one example system of the subset of the systems used for phase power load balancing a set of systems; where, for example the set of systems comprises a data center or other central power infrastructure, which provides a three-phase power source for the set of systems. System 200, and each system of the set of systems, receives three-phase power feed outputs from the data center or other central infrastructure comprising a main utility three-phase power source. System 200 is coupled to a data center infrastructure management (DCIM) system 201 for extraction of phase currents (i.e., phase power) of respective output phase power load values from the DCIM system 201 for the set of systems.

System 200 includes a PDU 202, which supports Delta and Wye input power configurations in accordance with a disclosed embodiment. The PDU 202 of system 200 includes a PDU switch bank 204 including an array of output load switches 205 selectively controlled for connecting one or more power input lines or phases Phase A, Phase B, and Phase C to PDU output power ports 206 of disclosed embodiments. System 200 includes a PDU switch control module 208, and a PSU load shifting control module 210 in accordance with a disclosed embodiment. System 200 includes one or more PSUs 212 coupled to the PDU switchable output ports 206 for PSU load shifting in accordance with a disclosed embodiment.

The PDU switch control module 208 receives extracted feed output power load phase values 214, and optionally can receive separate sensed PDU output port power load phase values 216, (e.g., when PDU output port power load phase values are unavailable from the DCIM system 201). The PDU switch control module 208 operatively controls the plurality of output load switches 205 of the PDU switch bank 204 for switching input phases that connect to one or more PDU output ports for optimal power balancing of system 200 based on the PDU Output Load Switching Control Code 182. The PDU switch control module 208 operatively controls the plurality of output load switches 205 of the PDU switch bank 204 for switching input phases that connect to one or more PDU output ports altering power balancing of system 200 based on the Phase Power Load Balance Altering Control Code 184 in accordance with disclosed embodiments. The PSU load shifting control module 210 receives extracted feed output power load phase values 214 and operatively controls phase shifting between PSUs 212 based on the Phase Power Load Balance Altering Control Code 184 in accordance with disclosed embodiments.

Figure 3A:
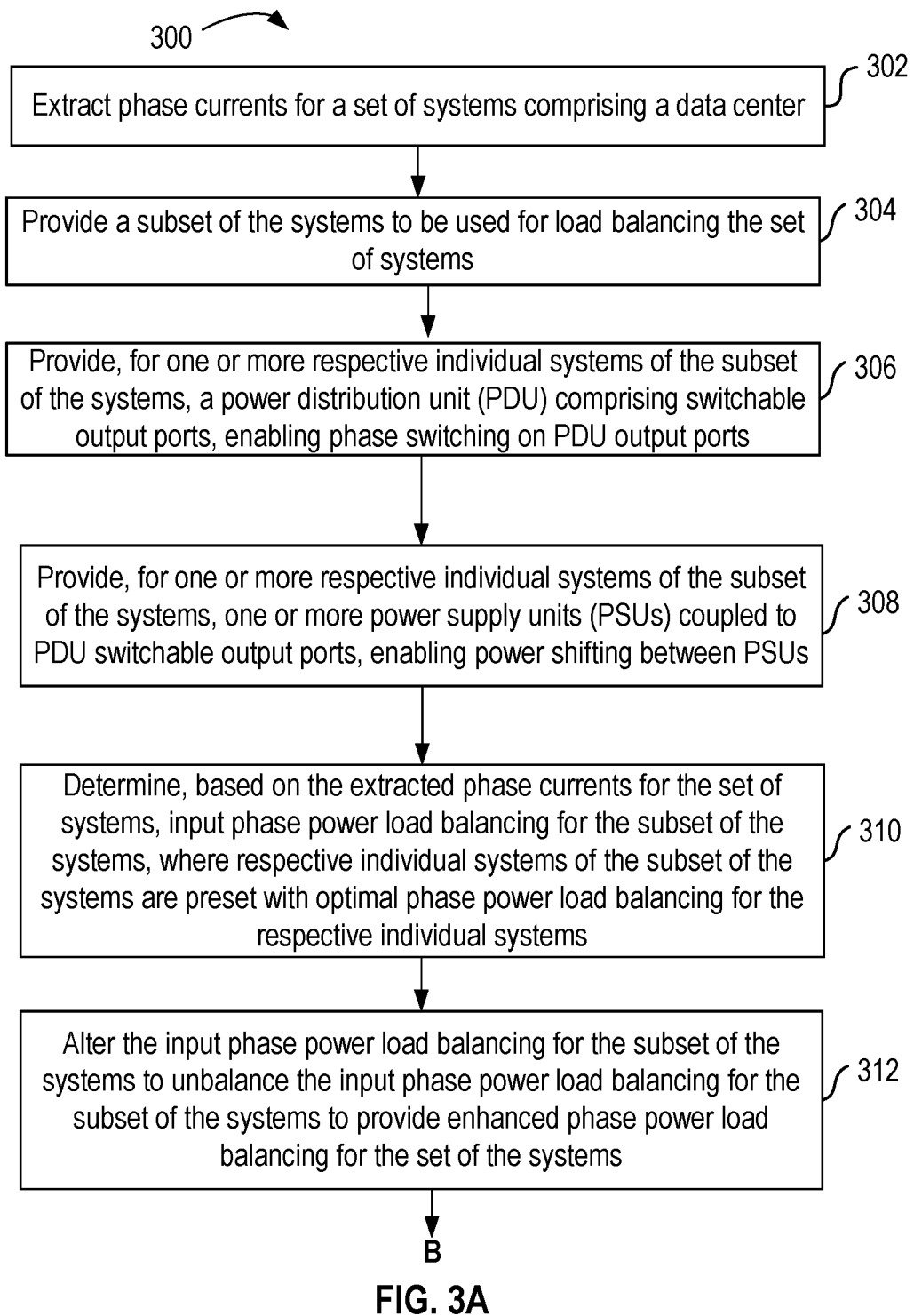
FIGS. 3A and 3B together provide a flow chart illustrating example operations of a method for implementing phase load balancing of a set of systems using a subset of the systems of a disclosed embodiment.
Figure 3B:
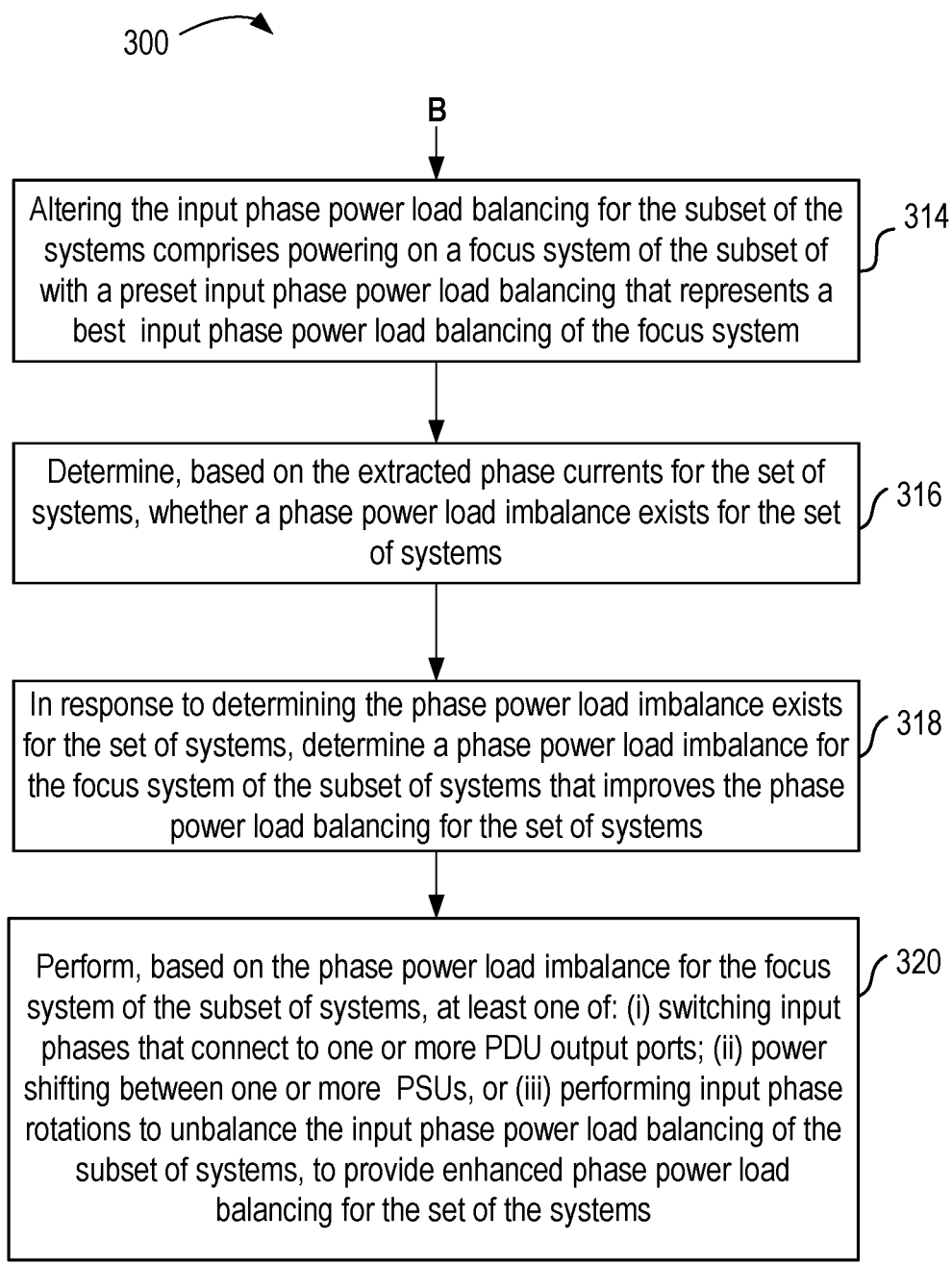

FIGS. 3A and 3B together illustrate example operations of a method 300 of one or more disclosed embodiments. The method 300 implements power load balancing of a set of systems using a subset of the systems of disclosed embodiments. In FIGS. 2, 3A, 3B, 4A, 4B, 5A, 5B, and 6, the same reference numbers are used for the same or similar components. System 200 (e.g., using the PDU switch control module 208, the PSU load shifting control module 210, a system microcode of the PDU Output Load Switching Control Code 182, and the Phase Power Load Balance Altering Control Code 184) controls input phase power load balancing, and controls altering the input phase power load balancing, of the subset of the systems of disclosed embodiments.

At block 302 in FIG. 3A, system 200 extracts phase currents of a set of systems, (e.g., data center) the extracted phase currents include phase power load values of three-phase power feed outputs for the set of systems of the data center. For example, the extracted phase currents are obtained from the data center infrastructure management (DCIM) system 201 of FIG. 2. At block 304, system 200 provides a subset of the systems to be used for load balancing the set of systems (e.g., the set of systems of a data center). In a disclosed embodiment, the subset of systems are selected based on an ability of respective individual systems to alter phase balancing for the individual system point of view, such as alter power phase inputs coupled to one or more power load outputs of associated loads and based on phase power information being available for power input phases of the respective individual systems of the subset of the systems. For example, enhanced phase power load balancing of the set of systems is enabled using the subset of the systems, where the subset of the systems is a small number of systems relative to number of the entire set of systems. At block 306, system 200 provides, for one or more respective individual systems of the subset of the system, a PDU comprising switchable output ports in the one or more respective individual systems. At block 308, system 200 provides, for one or more respective individual systems of the subset of the system, PSUs 212 that supports load shifting coupled to PDU output ports of the PDU in the one or more respective individual systems. For example, input phases that connect to one or more PDU output ports can be selectively switched (i.e., PDU output ports are selectively switched from one input phase to another input phase) to distribute power to respective associated loads via the PSUs 212. For example, the PSUs 212 are used to selectively shift load power between PDU output ports, based on the input phases that connect to one or more PDU output ports, to distribute power to respective associated loads.

At block 310, system 200 determines, based on extracted phase currents for the set of systems, an input phase power load balancing for the subset of the systems. The starting input phase power load balancing for the subset of the systems includes substantially equal power for the three input phases. For example, system 200 determines optimal (e.g., substantially equal) set points for input power load phases of the subset of the systems (where the extracted phase currents for the set of systems does not include specific information about each system within the data center set of systems or the ability to alter other systems power inputs).

System 200 monitors the set of systems to determine if a phase power load imbalance exists for the set of systems, (i.e., if a data center level threshold phase power load imbalance exists). In a disclosed embodiment, system 200 measures phase currents for the set of systems and determines if a phase imbalance of the set of systems is greater than a predefined threshold phase imbalance for the set of systems. For example, when system 200 determines that all phase currents of the set of systems are within 10% of each other for a given phase imbalance of the set of systems, system 200 continues monitoring phase currents for the set of systems. For example, when all phase currents are within 10% of each other, there is little to be gained by phase load balancing, so system 200 takes no action to alter the input phase currents of a focus system.

In a disclosed embodiment, when one phase is 30% higher than the average of all 3 phases for the set of systems, system 200 may take action to provide enhanced phase power load balancing for the set of systems by altering the input phase currents of a focus system. At block 312, system 200 alters the input phase power load balancing for the subset of the systems to unbalance the input phase power load balancing for the subset of the systems, to provide enhanced phase power load balancing for the set of systems illustrated in FIG. 3B. Operations continue at block 314 following entry point B in FIG. 3B.

Referring to FIG. 3B, there are shown operations and details of the altering the input phase power load balancing for the subset of the systems of method 300. As shown at block 314, a starting point for altering the input phase power load balancing for the subset of the systems includes a first or focus system the subset of the systems is powered on with preset phase balancing (as provided at block 310 in FIG. 3A, e.g., best phase balancing for the individual system point of view). At block 316, system 200 détermines, based on extracted phase currents for the set of systems, whether a phase power load imbalance exists for the set of systems, (i.e., if a phase power load imbalance exists at a data center level). For example, a phase power load imbalance exists when the set of systems draw more power from one power feed output phase than the other power feed output phases, rather than drawing substantially equal power from the three power feed output phases. In an embodiment, system 200 extracts phase currents, obtaining power feed output phase currents for the set of the systems from the DCIM system for determining if a phase power load imbalance exists for the set of systems.

At block 318, system 200, upon determining a phase imbalance exists for the set of systems, determines a power imbalance for the focus system of the subset of the systems that improves phase balancing for the set of systems. System 200 limits the power imbalance to be provided by the focus system based on at least one predefined qualifier, such as a constraint of a maximum phase current of any focus system that must be within pre-determined margins of ratings (e.g., ratings of circuit breakers, cables, line cords, and the like). In a disclosed embodiment, the power imbalance for the focus system of the subset of the systems may result in placing substantial current on one or two phase lines of the single system, with the focus system having substantial unbalanced input line currents, which helps to balance three-phase input feeds of the set of systems (e.g., datacenter infrastructure).

At block 320, system 200 performs, based on the power imbalance for the focus system of the subset of systems, at least one of: (i) switching input phases that connect to one or more PDU output ports; (ii) power shifting between one or more PSUs; or (iii) performing input phase rotations for the subset of the systems, to provide the enhanced phase power load balancing for the set of systems. In a disclosed embodiment, system 200 algorithmically alters phase currents, based on an algorithm built into a microcontroller within the infrastructure, to provide the enhanced phase power load balancing for the set of systems. System 200 monitors the set of systems, rechecking the phase currents of the set of systems to determine if a threshold phase power load imbalance still exists for the set of systems before proceeding to altering the input phase power load balancing for a next focus system in the subset of systems.

For example, if the set of systems has substantially higher current on Phase A and lower current on Phase C, the focus system may switch some of the PDU output ports from Phase A to Phase C. This switching may be performed even though the focus system in isolation worsens its phase balancing, as long as the phase current is not calculated to approach system limits. This change in the focus system improves the set of systems' phase balancing, which can enable the infrastructure to better utilize site power and reduce conduction losses.

Figure 4A:
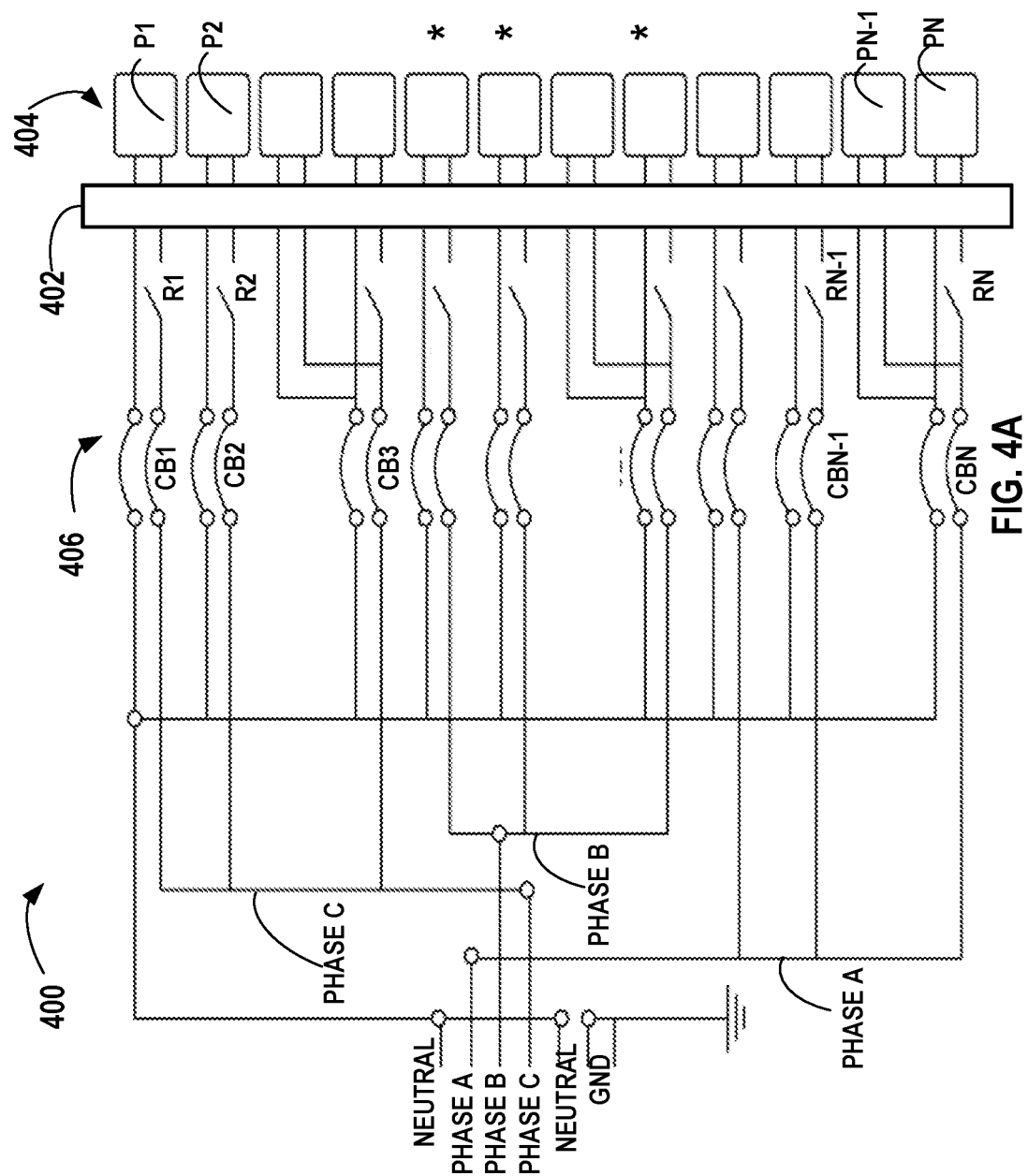
FIG. 4A is a schematic and block diagram of an example PDU including a switch bank of output load switches for an input power Wye-configuration of one or more disclosed embodiments.

FIG. 4A illustrates a PDU 400 of Wye-configuration input for the PDU 202 and switch bank 204 of FIG. 2. As shown, PDU 400 includes a switch bank 402 of an array of output load switches, such as load switches 205 of the switch bank 204 in FIG. 2, coupled to each of the respective PDU output ports 404 P1-PN of a disclosed embodiment. The power inputs Phase A, Phase B, and Phase C are coupled to the switch bank 402 by respective ones of series-connected circuit breakers (CB) and relays (R) 406, CB1-CBN and R1-RN with Neutral coupled to the switch bank 402 by the respective circuit breakers CB1-CBN. The array of output load switches of the switch bank 402 provides respective ones of Phase A, Phase B, and Phase C to the PDU output ports 404, P1-PN.

Figure 4B:
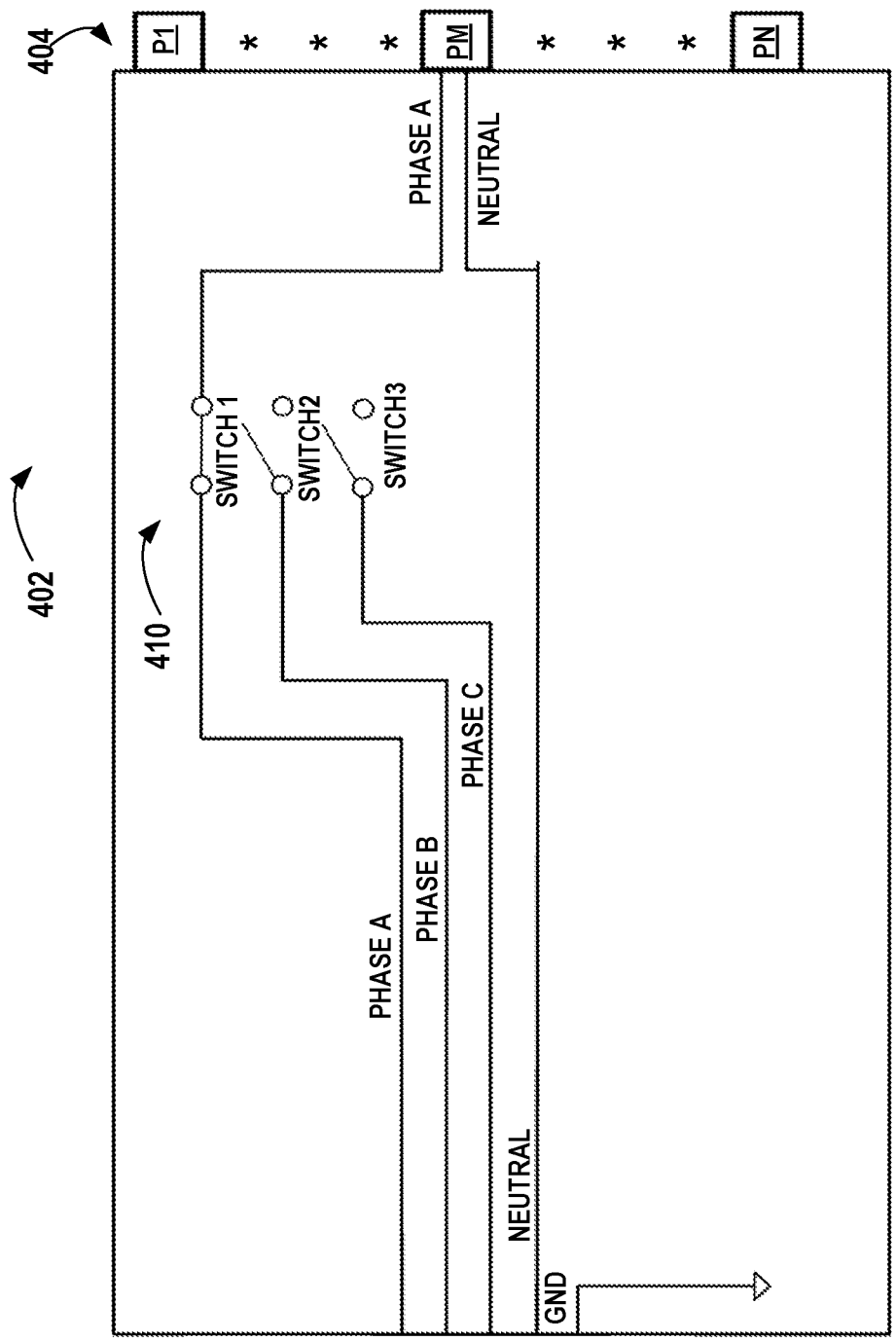
FIG. 4B is a schematic and block diagram of an example Wye-configured PDU with switches that can connect output receptacles to more than one input line of one or more disclosed embodiments.

FIG. 4B illustrates an example portion of switch bank 402 for one output port 404 PM of the Wye-configuration input PDU 400 of FIG. 4A of a disclosed embodiment. FIG. 4B illustrates an example switch group of example PDU output load switches 410, SWITCH1, SWITCH2, and SWITCH3, which are controlled to provide input phase balancing, with each respective switch group configured for connection to each of the respective PDU output ports 404 P1-PN. PDU output load switches 410, SWITCH1, SWITCH2, and SWITCH3 can be implemented by different types of electrical switching devices, for example, based on selected switching control options and properties of the connected loads. For example, the PDU output load switches 410 SWITCH1, SWITCH2, and SWITCH3 can be implemented using relays as the electrical switching devices, or implemented with solid state switching devices, such as Triac switching devices, Insulated Gate Bipolar Transistor (IGBT) switching devices, and Metal Oxide Semiconductor Field Effect Transistor (MOSFET) switching devices.

In the illustrated switch group, the switch 410, SWITCH1 is connected to power input Phase A, the switch 410, SWITCH2 is connected to power input Phase B, and the switch 410, SWITCH3 is connected to power input Phase C. One of the three PDU output load switches 410, SWITCH1, SWITCH2, or SWITCH3 is operatively controlled to connect an associated power input Phase A, Phase B, or Phase C to a line side of a given one of the respective PDU output ports 404 P1-PN with the neutral input connected to the other side of each of the respective PDU output ports 404 P1-PN of disclosed embodiments. As shown, the PDU output load switch 410, SWITCH1 connects power input Phase A to the line side of PDU output port 404 PM. For the Wye-configuration input PDU 400, the three PDU output load switches 410, SWITCH1, SWITCH2, and SWITCH3 are required for maximum flexibility for three-phase input phase load balancing. It should be understood that one or multiple output ports within the output ports 404 P1-PN may also be connected to output load switches in a similar fashion to output load switches 410, SWITCH1, SWITCH2, SWITCH3, such that other output ports may also be connected to input Phase A similar to output port 404 PM connected by the illustrated output load switches 410, SWITCH1 and used to intelligently balance the input power being pulled from each input line or power inputs Phase A, Phase B, and Phase C. It should be understood that the disclosed embodiments are not limited to the illustrated three load switches 410, SWITCH1, SWITCH2, and SWITCH3. In a disclosed embodiment, respective PDU output load switches 410, SWITCH1, SWITCH2, or SWITCH3, used with each of the output port 404 P1-PN, are operatively controlled to intelligently balance the input power being pulled from each input line or power inputs Phase A, Phase B, and Phase C. It should be understood fewer switches could be used, with limitations to input phase balancing, for example based on selected tradeoffs to balance one or more of cost, size, design complexity or capability.

Figure 5A:
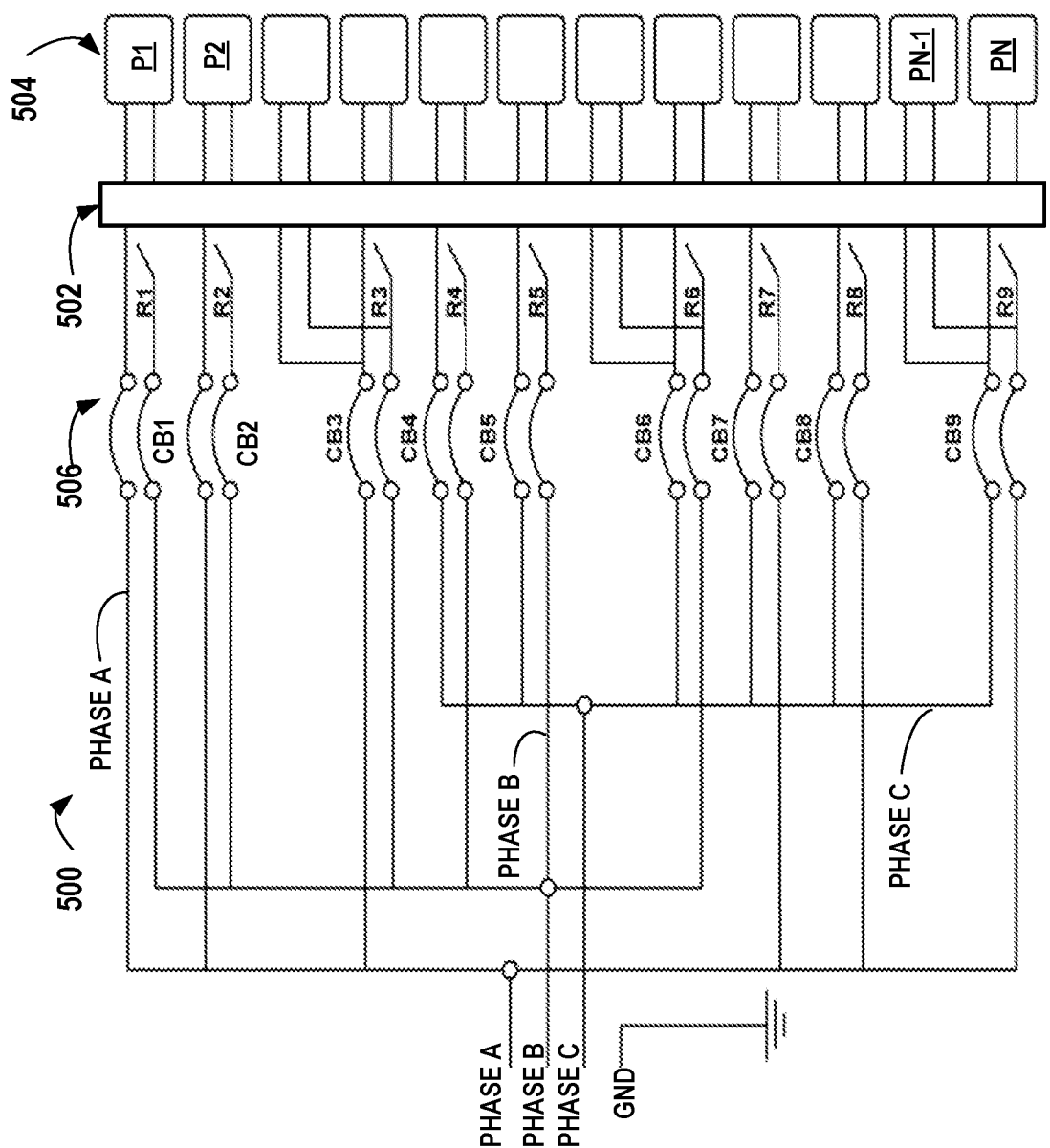
FIG. 5A is a schematic and block diagram of an example PDU including a switch bank of output load switches for an input power Delta-configuration of one or more disclosed embodiments.
Figure 5B:
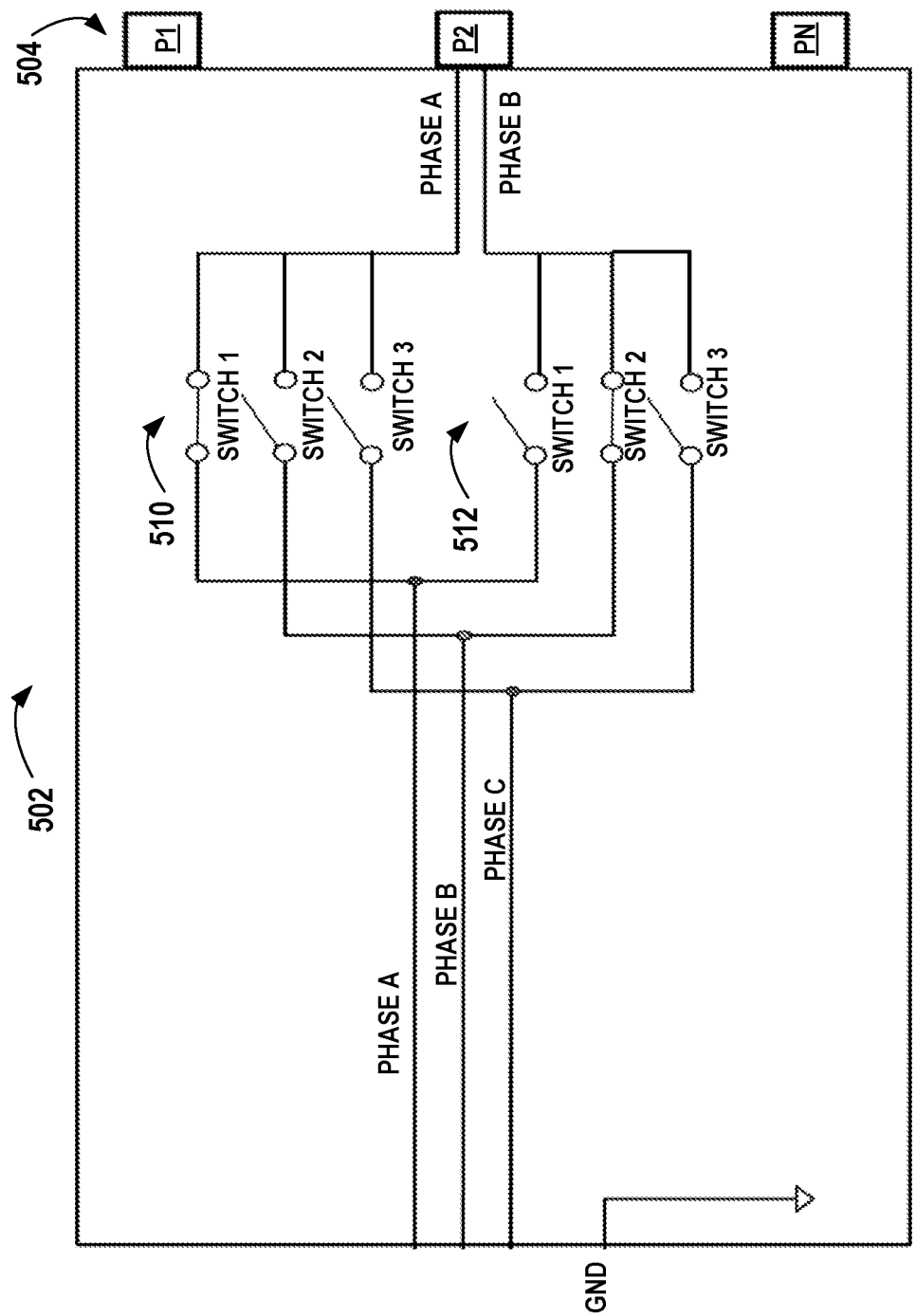
FIG. 5B is a schematic and block diagram of an example Delta-configured PDU with switches that can connect output receptacles to more than one input line of one or more disclosed embodiments.

FIG. 5A illustrates an example PDU 500 for a Delta-configuration input, (e.g., the Neutral input is not used) including a switch bank 502 of an array of output load switches, such as illustrated in the example switch bank 502 of FIG. 5B. For example, the switch bank 502 provides input Phase lines A, B, Phase lines B, C, or Phase lines C, A coupled to respective ones of the PDU output ports 504 P1-PN. PDU 500 is configured to automatically connect to the input voltage of the Delta-configuration with two Phase lines of inputs Phase A, Phase B, and Phase C coupled to respective PDU output ports. The power inputs Phase A, Phase B, and Phase C are coupled to the switch bank 502 by a respective ones of series-connected circuit breakers (CB) and relays (R) 506, CB1-CB9 and R1-R9. Nine circuit breakers and relays are shown for illustrative purposes only. Any number of circuit breakers and relays could be used depending upon the number of output ports used.

FIG. 5B is a schematic and block diagram of example PDU output load switches for the Delta input power configuration PDU 500 of FIG. 5A of a disclosed embodiment. In a disclosed embodiment, for example, the switch bank 502 for the Delta input power configuration includes two switch groups of three load switches 510, SWITCH1, SWITCH2, and SWITCH3 and three load switches 512, SWITCH1, SWITCH2, and SWITCH3. In a disclosed embodiment, the illustrated six load switches are used with each PDU output port 504, P1-PN for maximum flexibility with the Delta input. The PDU output load switches 510, SWITCH1, SWITCH2, and SWITCH3, and the PDU output load switches 512, SWITCH1, SWITCH2, and SWITCH3 can be implemented using relays as the electrical switching devices, or implemented with various solid state switching devices. The PDU output load switches 510, SWITCH1, SWITCH2, and SWITCH3, and the PDU output load switches 512, SWITCH1, SWITCH2, and SWITCH3 of the respective switch groups 510, 512 are operatively controlled to respectively switch in different Phase lines, such as Phase lines A, B, Phase lines B, C, or Phase lines C, A to each given PDU output port 504 of the respective PDU output ports 504, P1-PN. As shown, switch 510 SWITCH1 and switch 512 SWITCH2 connect Phase lines A, B to power inputs of the PDU output port 504, P2. It should be understood that the disclosed embodiments are not limited to the illustrated six load switches used with each PDU output port 504, P1-PN; fewer than the six switches could be used to achieve input phase load balancing, for example based on selected tradeoffs to balance one or more of cost, size, design complexity or capability.

Figure 6:
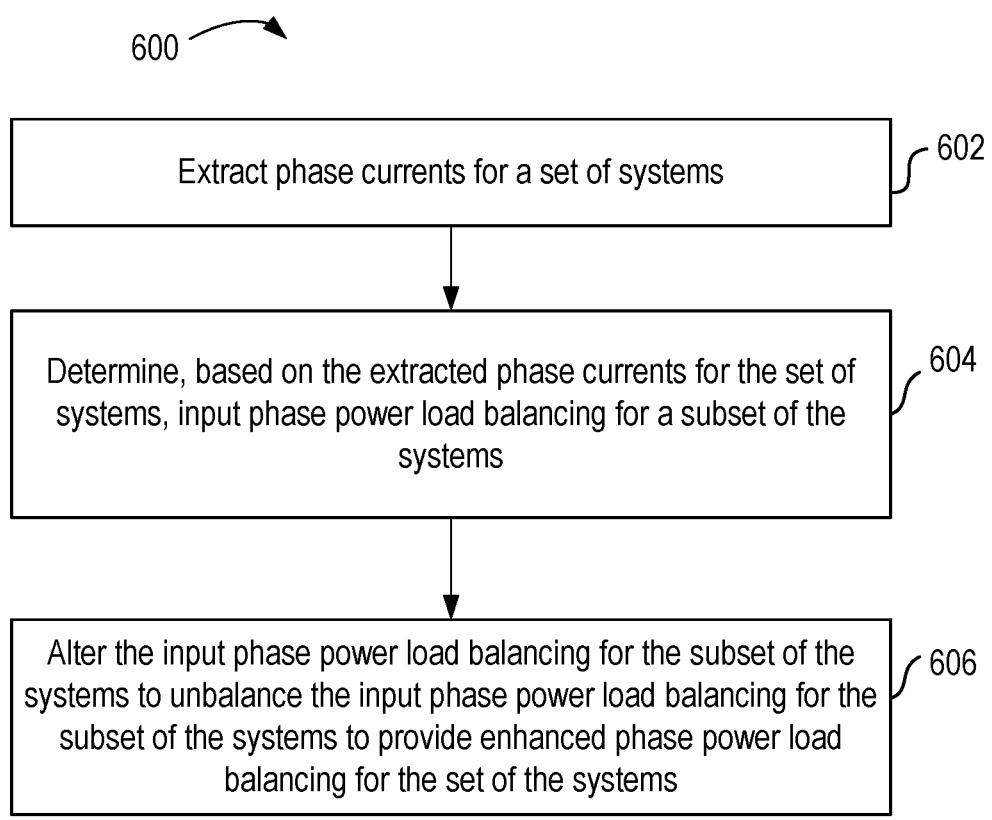
FIG. 6 is a flow chart of example operations of a method for implementing phase load balancing of a set of systems using a subset of the systems of a disclosed embodiment.

FIG. 6 illustrates a method 600 for implementing system phase balancing of a disclosed embodiment. Method 600 illustrates features and operations of method 300 of disclosed embodiments. The method 600 can be implemented by the system 200 in conjunction with the computer 101 of the cloud environment 100 of FIG. 1 with the PDU Output Load Switching Control Code 182 and the Phase Balance Altering Control Code 184.

At block 602, system 200 extracts phase currents for a set of systems, where the phase currents comprise three-phase current outputs applied to the respective systems, for example of a data center. In a disclosed embodiment, phase power load values are obtained from the power feed output phase currents for the set of the systems extracted from a data center infrastructure management (DCIM) system. For example, the set of the systems distribute power to attached electrical equipment, such as computers, peripherals, computer cooling equipment, and the like.

At block 604, system 200 determines, based on the extracted phase currents for the set of systems, input phase power load balancing for a subset of the systems. For example, system 200 determines input phase power load balancing for the subset of the systems starting with substantially equal power for the three input phases of the respective individual systems of the subset of systems. For example, system 200 determines substantially equal or optimal phase currents for the three power input phases coupled to system outputs.

At block 606, system 200 alters the input phase power load balancing for the subset of the systems to unbalance the input phase power load balancing of the subset of the systems to provide enhanced phase power load balancing for the set of systems. In a disclosed embodiment, system 200 determines the power load imbalance for the subset of the systems by unbalancing a first or focus system of the subset of systems to identify a power load imbalance of the focus system that improves the phase power load balancing for the set of systems. In a disclosed embodiment, the other respective systems of the subset of systems are unbalanced, based on the unbalancing the focus system, to provide optimal phase power load balancing for the set of systems. In a disclosed embodiment, system 200 alters the input phase power load balancing for the subset of the systems by performing, based on the power imbalance for the focus system of the subset of systems, at least one of: (i) switching input phases that connect to one or more PDU output ports; (ii) power shifting between one or more PSUs; or (iii) performing input phase rotations for the subset of the systems, to provide the enhanced phase power load balancing for the set of systems. In a disclosed embodiment, one or more respective individual systems of the subset of the system include a PDU comprising switchable output ports, and include PSUs 212 that supports load shifting coupled to PDU output ports of the PDU. In a disclosed embodiment, input phases that connect to one or more PDU output ports 206 of the one or more respective individual systems are selectively switched from one input phase to another input phase to provide enhanced phase power load balancing of the set of systems, with the unbalanced subset of systems. Further the PSUs 212 are used to selectively shift load power between PDU output ports, based on the input phases that connect to one or more PDU output ports, to distribute power to respective associated loads, to provide enhanced phase power load balancing of the set of systems, with the unbalanced subset of systems.

While the foregoing is directed to embodiments of the present invention, other and further embodiments of the invention may be devised without departing from the basic scope thereof, and the scope thereof is determined by the claims that follow.

What is claimed is:

1. A method comprising:
   extracting phase currents for a set of systems, wherein the phase currents comprise three-phase current source outputs applied to the set of systems;
   selecting a subset of the set of systems used for phase power load balancing the set of systems, wherein the subset comprises a respective power distribution unit (PDU) comprising switchable PDU output ports coupled to respective systems of the subset, and wherein three input phases of the systems of the subset are initially balanced to have substantially equal power;
   monitoring the set of systems to identify a phase power load imbalance of the set of systems; and
   altering the initial balancing for the subset, based on the phase power imbalance of the set of systems, to unbalance the input phase power balancing of the subset to provide enhanced phase power load balancing for the set of systems; wherein altering the initial balancing of the subset further comprises:

determining a power imbalance of a focus system of the subset that improves phase power balancing of the set of systems; and
altering input phase currents of the focus system to unbalance the initial balancing of the subset by selectively switching input phases of the focus system that connect to the switchable PDU output ports.

2. The method of claim 1, wherein monitoring the set of systems to identify the phase power load imbalance of the set of systems further comprises monitoring the three extracted phase currents for the set of systems to determine a difference between the three extracted phase currents greater than a threshold value to identify the phase power load imbalance of the set of systems.

3. The method of claim 1, further comprising:
providing one or more power supply units (PSUs) coupled to the switchable PDU output ports coupled to the respective systems of the subset; and wherein the altering the initial balancing for the subset further comprises power shifting between the one or more PSUs to unbalance the initial balancing of the subset of the systems to provide the enhanced phase power load balancing for the set of systems.

4. The method of claim 1, wherein the altering the initial balancing for the subset further comprises performing input phase rotations for one or more systems of the subset of the systems to unbalance the initial balancing of the subset to provide the enhanced phase power load balancing for the set of systems.

5. The method of claim 1, wherein the altering the initial balancing for the subset further comprises performing input phase rotations for the focus system of the subset of the systems to unbalance the initial balancing for the subset.

6. The method of claim 1, further comprises providing one or more power supply units (PSUs) coupled to the PDU switchable output ports of the focus system; and wherein altering the input phase currents of the focus system to unbalance the initial balancing of the subset further comprises power shifting between the one or more PSUs of the focus system to provide the enhanced phase power load balancing for the set of systems.

7. The method of claim 1, wherein extracting phase currents for the set of the systems further comprises obtaining power feed output phase currents for the set of the systems from a data center infrastructure management (DCIM) system.

8. The method of claim 1, wherein monitoring the set of systems to identify the phase power load imbalance of the set of the systems further comprises obtaining output port power values of the switchable PDU output ports of the focus system; and determining, based on the output port power values, a phase power load imbalance for the focus system that improves the phase power load balancing for the set of systems.

9. The method of claim 8, wherein altering the input phase currents of the focus system further comprises selectively switching input phases of the focus system that connect to one or more PDU output ports based on the output port power values that determine the phase power load imbalance for the focus system.

10. The method of claim 1, wherein altering the initial balancing for the subset further comprises algorithmically altering the input phase currents of the focus system, based on a phase power load balancing algorithm built into a data center infrastructure management (DCIM) system, to provide the enhanced phase power load balancing for the set of systems.

11. A system, comprising one or more computer processors; and a memory containing a program which when executed by the one or more computer processors performs an operation, the operation comprising:
extracting phase currents for a set of systems, wherein the phase currents comprise three-phase current source outputs applied to the set of systems;
selecting a subset of the set of systems used for phase power load balancing the set of systems, wherein the subset comprises a respective power distribution unit (PDU) comprising switchable PDU output ports coupled to respective systems of the subset, and wherein three input phases of the systems of the subset are initially balanced to have substantially equal power;
monitoring the set of systems to identify a phase power load imbalance of the set of systems; and
altering the initial balancing for the subset, based on the phase power imbalance of the set of systems, to unbalance the input phase power balancing of the subset to provide enhanced phase power load balancing for the set of systems; wherein altering the initial balancing of the subset further comprises:
determining a power imbalance of a focus system of the subset that improves phase power balancing of the set of systems; and
altering input phase currents of the focus system to unbalance the initial balancing of the subset by selectively switching input phases of the focus system that connect to the switchable PDU output ports.

12. The system of claim 11, wherein monitoring the set of systems to identify the phase power load imbalance of the set of systems further comprises monitoring the three extracted phase currents for the set of systems to determine a difference between the three extracted phase currents greater than a threshold value to identify the phase power load imbalance of the set of systems.

13. The system of claim 12, further comprising:
providing one or more power supply units (PSUs) coupled to the switchable PDU output ports of the focus system; and wherein altering input phase currents of the focus system further comprises power shifting between the one or more PSUs to unbalance the initial balancing of the subset to provide the enhanced phase power load balancing for the set of systems.

14. The system of claim 11, wherein extracting phase currents for the set of the systems further comprises obtaining power feed output phase currents for the set of the systems from a data center infrastructure management (DCIM) system.

15. The system of claim 11, wherein monitoring the set of the systems further comprises obtaining output port power values of the switchable PDU output ports of the focus system; and determining, based on the output port power values, the power imbalance for the focus system that best improves the phase power load balancing for the set of systems.

16. A computer program product comprising a computer-readable storage medium having computer-readable program code embodied therewith, the computer-readable program code executable by one or more computer processors to perform an operation comprising:
extracting phase currents for a set of systems, wherein the phase currents comprise three-phase current source outputs applied to the set of systems;
selecting a subset of the set of systems used for phase power load balancing the set of systems, wherein the subset comprises a respective power distribution unit (PDU) comprising switchable PDU output ports coupled to respective systems of the subset, and wherein three input phases of the systems of the subset are initially balanced to have substantially equal power;

monitoring the set of systems to identify a phase power load imbalance of the set of systems; and altering the initial balancing for the subset, based on the phase power imbalance of the set of systems, to unbalance the input phase power balancing of the subset to provide enhanced phase power load balancing for the set of systems; wherein altering the initial balancing of the subset further comprises:

determining a power imbalance of a focus system of the subset that improves phase power balancing of the set of systems; and altering input phase currents of the focus system to unbalance the initial balancing of the subset by selectively switching input phases of the focus system that connect to the switchable PDU output ports.

17. The computer program product of claim 16, wherein monitoring the set of systems to identify the phase power load imbalance of the set of systems further comprises monitoring the three extracted phase currents of the set of systems to determine a difference between the three extracted phase currents greater than a threshold value to identify the phase power load imbalance of the set of systems.

18. The computer program product of claim 17, further comprising:

providing one or more power supply units (PSUs) coupled to the switchable PDU output ports of the focus system; and wherein the altering the initial balancing for the subset further comprises power shifting between the one or more PSUs to unbalance the initial balancing of the subset to provide the enhanced phase power load balancing for the set of systems.

19. The computer program product of claim 16, wherein extracting phase currents for the set of the systems further comprises obtaining power feed output phase currents for the set of the systems from a data center infrastructure management (DCIM) system.

20. The computer program product of claim 16, wherein monitoring the set of the systems further comprises obtaining output port power values of the switchable PDU output ports of the focus system; and determining, based on the output port power values, the power imbalance for the focus system that best improves the phase power load balancing for the set of systems.

* * * * *